US008807594B2

(12) United States Patent
Mizobata

(10) Patent No.: US 8,807,594 B2
(45) Date of Patent: Aug. 19, 2014

(54) VEHICLE SEAT WITH AIR BAG

(75) Inventor: Hiroshi Mizobata, Seto (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 135 days.

(21) Appl. No.: 13/477,386

(22) Filed: May 22, 2012

(65) Prior Publication Data

US 2012/0299342 A1 Nov. 29, 2012

(30) Foreign Application Priority Data

May 25, 2011 (JP) ................................ 2011-117096

(51) Int. Cl.

*B60R 21/207* (2006.01)
*B60N 2/70* (2006.01)
*B60N 2/60* (2006.01)
*B60N 2/58* (2006.01)

(52) U.S. Cl.

CPC ............ *B60N 2/6009* (2013.01); *B60N 2/7011* (2013.01); *B60R 21/207* (2013.01); *B60N 2002/5808* (2013.01)
USPC .................................. 280/730.2; 297/216.13

(58) Field of Classification Search

CPC ................................ B60R 21/207; B60N 2/42
USPC .................................. 280/730.2; 297/216.13
See application file for complete search history.

(56) References Cited

U.S. PATENT DOCUMENTS

| | | | | |
|---|---|---|---|---|
| 5,799,971 | A * | 9/1998 | Asada | 280/730.2 |
| 5,860,673 | A * | 1/1999 | Hasegawa et al. | 280/730.2 |
| 6,224,092 | B1 * | 5/2001 | Sakamoto et al. | 280/730.2 |
| 6,386,577 | B1 * | 5/2002 | Kan et al. | 280/730.2 |
| 7,281,735 | B2 * | 10/2007 | Acker et al. | 280/730.2 |
| 7,641,281 | B2 * | 1/2010 | Grimm | 297/216.13 |
| 2006/0163850 | A1 * | 7/2006 | Inazu et al. | 280/730.2 |
| 2006/0279074 | A1 * | 12/2006 | Tracht et al. | 280/730.2 |
| 2007/0182131 | A1 * | 8/2007 | Helbig et al. | 280/728.2 |
| 2008/0203787 | A1 | 8/2008 | Tracht et al. | |

FOREIGN PATENT DOCUMENTS

| | | |
|---|---|---|
| JP | 09-104316 | 4/1997 |
| JP | 2010-241172 | 10/2010 |

OTHER PUBLICATIONS

U.S. Appl. No. 13/413,956 to Takashi Oga et al., filed Mar. 7, 2012.

* cited by examiner

*Primary Examiner* — Paul N Dickson
*Assistant Examiner* — Robert A Coker
(74) *Attorney, Agent, or Firm* — Greenblum & Bernstein, P.L.C.

(57) ABSTRACT

A vehicle seat includes a seat frame, a pad that is attached to the seat frame, an air bag that is attached to the seat frame, a board that is attached to the seat frame and covers the air bag, and a cap that is made of material harder than the pad and is attached to the seat frame, and extends forward of a tip end edge of the board through a gap between the pad and the board.

7 Claims, 6 Drawing Sheets

1a(1)
2b
2c
2d
4
2
2a
8b
8a2
8a1
8
8a
8a3
9b
9
9a
9c
7d
7e
7
7f
7a
7b
7c
6
6c
6f
6e
6d
6a
6b 2
2c
2e
4
4a
2a
7f
7
7a
7b
7c
7d
10
2b
2b
6
6a
6b
6d

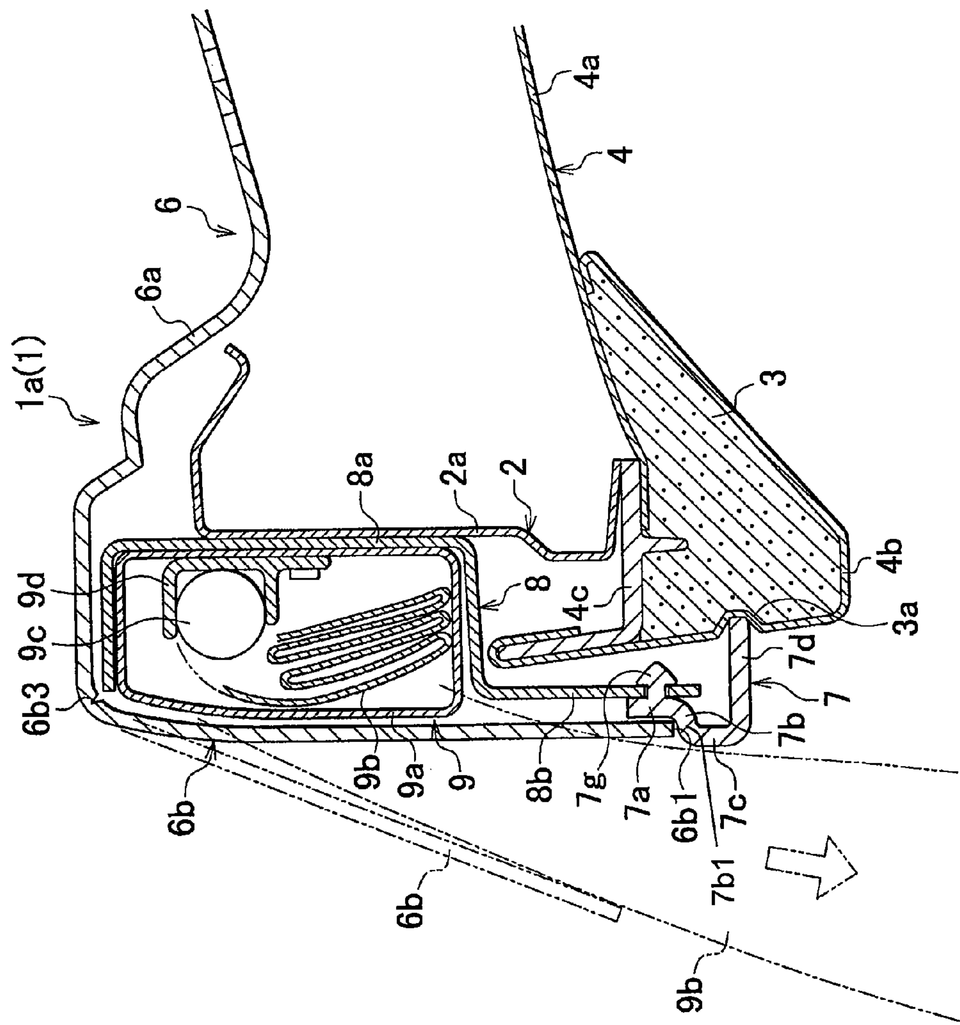
F I G . 4

VEHICLE SEAT WITH AIR BAG

INCORPORATION BY REFERENCE

The disclosure of Japanese Patent Application No. 2011-117096 filed on May 25, 2011 including the specification, drawings and abstract is incorporated herein by reference in its entirety.

BACKGROUND OF THE INVENTION

1. Field of the Invention

The invention relates to a vehicle seat provided with an air bag.

2. Description of Related Art

A vehicle seat described in Japanese Patent Application Publication No. 09-104316 (JP 09-104316 A) has a seat back that is provided with an air bag. The seat back includes a frame, a pad provided on the front side of the frame, an air bag provided on a side portion of the frame, and a back board that is attached to the frame. The back board has a board main body that covers the back surface of the seat back, and a cover piece that extends from a side edge of the board main body, covers the air bag, and extends beyond the pad. The cover piece has a tip end portion that abuts against the pad. When the air bag deploys, the cover piece deforms and the tip end portion separates from the pad. Accordingly, the air bag is able to inflate forward from between the cover piece and the pad.

However, the pad is soft. Thus, when pushed on, the pad deforms such that a gap is created between the tip end portion of the cover piece that is the tip end portion of the back board, and the pad. As a result, a finger or object may be able to be inserted into the gap. Therefore, a vehicle seat with an air bag is needed in which a finger or object cannot easily be inserted between the tip end portion of the board and the pad.

SUMMARY OF THE INVENTION

The invention thus provides a vehicle seat with an air bag in which a finger or object is not easily able to be inserted between the tip end portion of the board and the pad. A first aspect of the invention relates to a vehicle seat with an air bag that includes a seat frame, a pad that is attached to the seat frame, the air bag that is attached to the seat frame, a board that is attached to the seat frame and covers the air bag, and a cap that is made of material harder than the pad and is attached to the seat frame, and extends forward of a tip end edge of the board though a gap between the pad and the board.

The cap is attached to the seat frame so it will continue to be positioned forward of the tip end edge of the board even if the pad deforms as a result of being pushed on. Therefore, the cap is able to inhibit a finger or object from being inserted between the tip end edge of the board and the pad. Also, the cap is harder than the pad and thus will not deform as easily as the pad.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a sectional view taken along line IV-IV in FIG. 1;

DETAILED DESCRIPTION OF EMBODIMENTS

Figure 1:
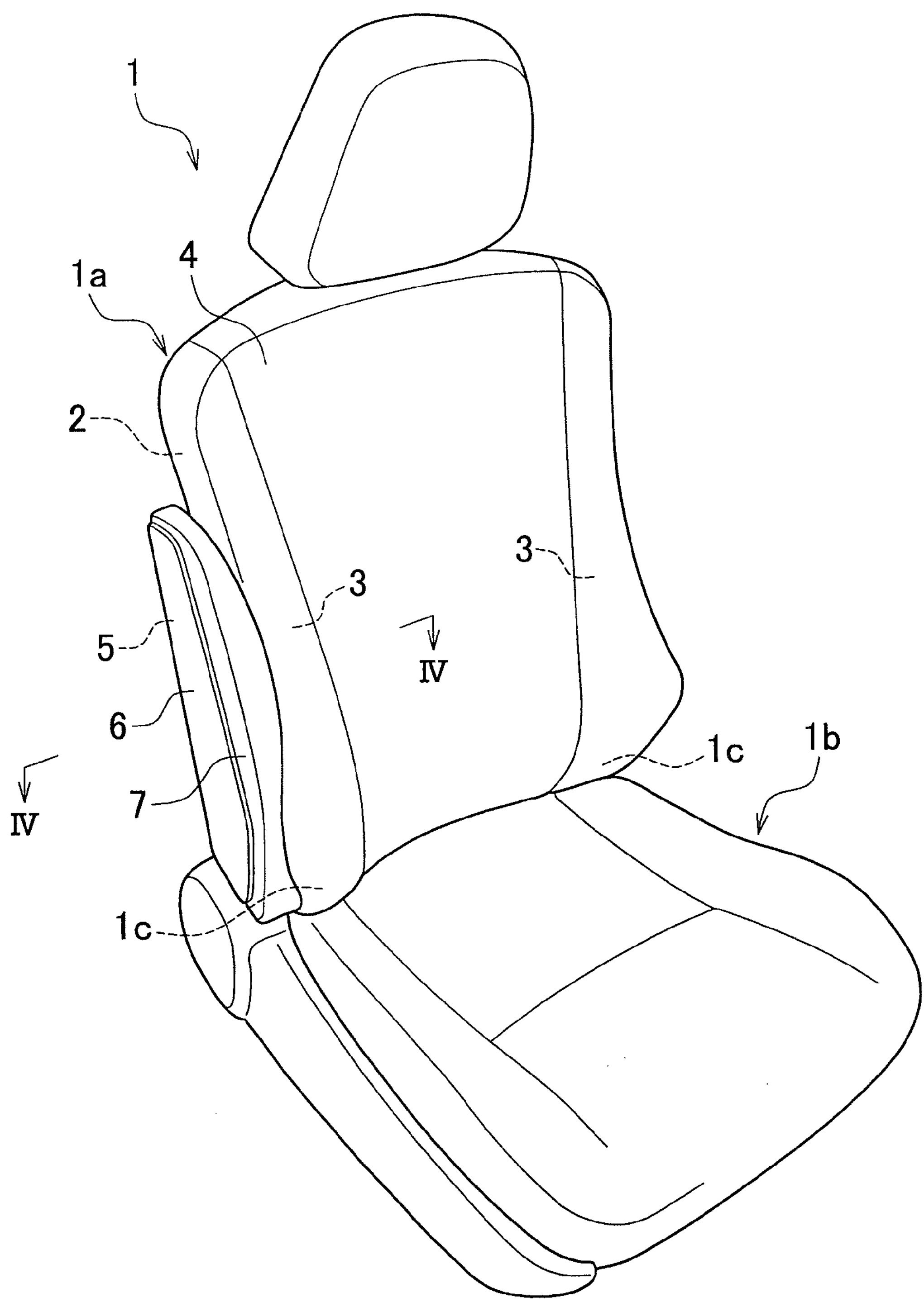
FIG. 1 is a perspective view of a vehicle seat according to an example embodiment of the invention.

An example embodiment of the invention will be described with reference to FIGS. 1 to 4. Hereinafter, the directions of front, rear, and outside will be used to indicate the front, rear, and outside in the width direction, respectively, of a vehicle seat 1. The vehicle seat 1 has a seat cushion 1*b* and a seat back 1*a*, as shown in FIG. 1. The seat back 1*a* is connected, in a manner such that the angle thereof can be adjusted, by a reclining apparatus 1*c* at a rear portion of the seat cushion 1*b*. The seat back 1*a* includes a seat frame 2, a cover 4, and a pad 3.

Figure 2:
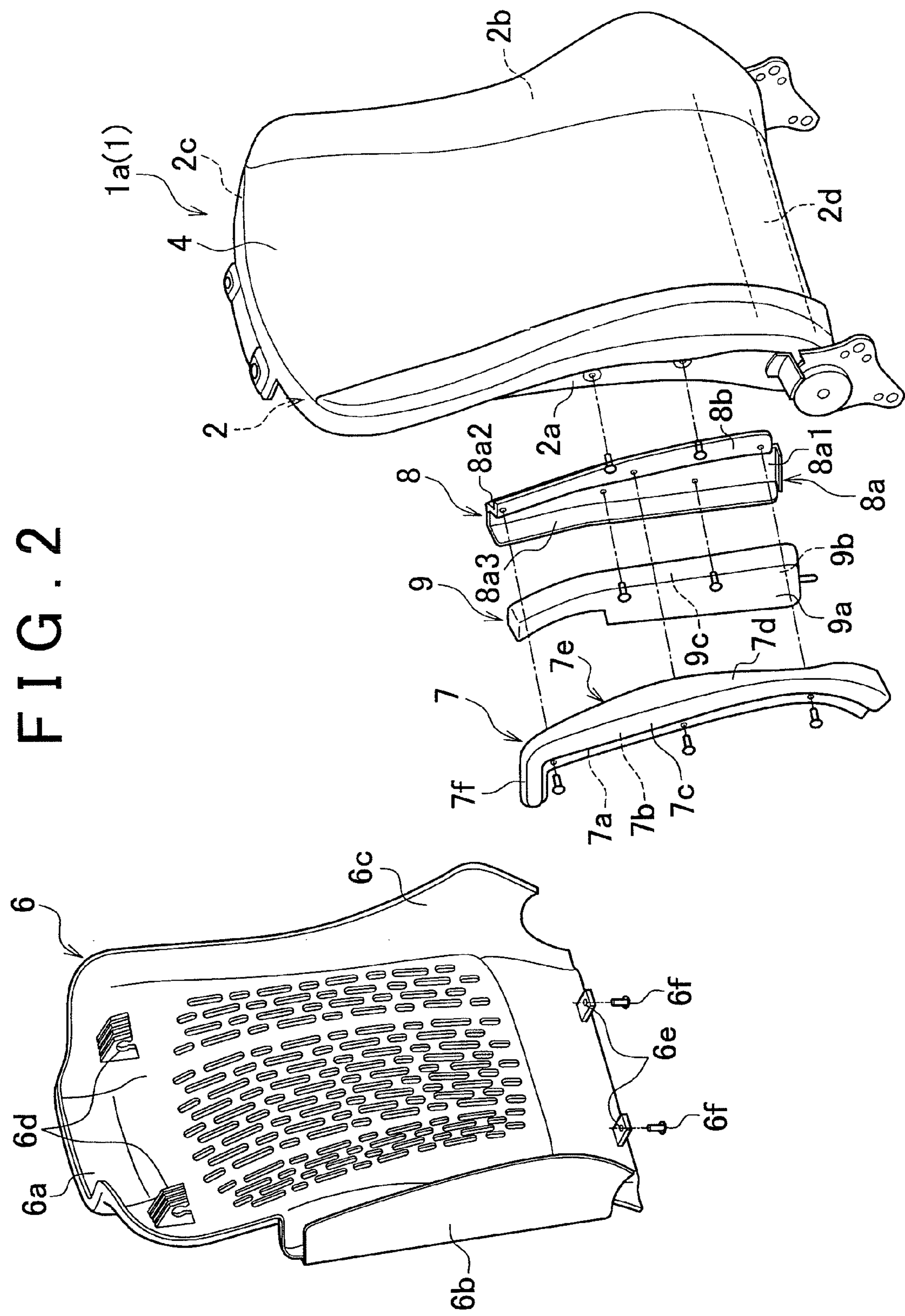
FIG. 2 is an exploded perspective view of a seat back.
Figure 3:
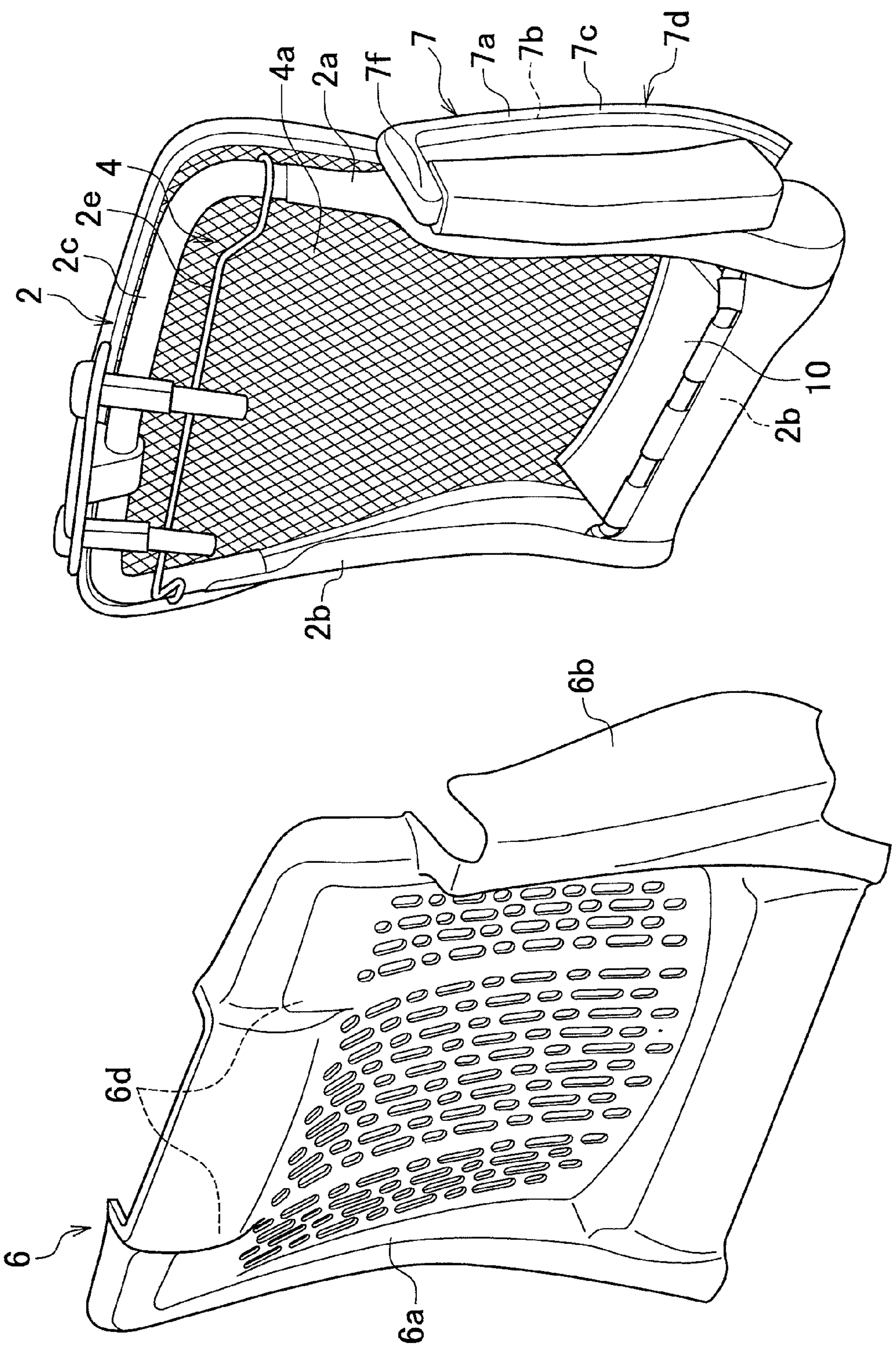
FIG. 3 is an exploded perspective view of the seat back as viewed from an angle behind the vehicle seat.

The seat frame 2 includes side frames 2*a* and 2*b*, an upper frame 2*c*, an under frame 2*d*, and a wire 2*e*, as shown in FIGS. 2 and 3. The side frames 2*a* and 2*b* are made of metal plate such as steel, and extend along the left and right edges of the seat back 1*a*. The upper frame 2*c* is made of metal and has a cylindrical shape, and connects the upper portions of the side frames 2*a* and 2*b* together. The under frame 2*d* is made of metal plate and connects the lower portions of the side frames 2*a* and 2*b* together. The wire 2*e* extends in the left-right direction at an upper portion on the back side of the seat frame 2. Both end portions of the wire 2*e* are fixed to the upper frame 2*c* or the side frames 2*a* and 2*b*.

The cover 4 has a main body portion 4*a* and a covering frame 4*c*, as shown in FIGS. 3 and 4. The main body portion 4*a* is made from net material or fabric material that has good stretch properties. The main body portion 4*a* is of a size that covers the front side of the seat frame 2. The covering frame 4*c* is made of resin and extends following the outer periphery of the main body portion 4*a*. The main body portion 4*a* is sewn to the covering frame 4*c* so as to be held taut. The covering frame 4*c* is attached to the upper frame 2*c*, and a lower end piece of the main body portion 4*a* is attached by being wound around the under frame 2*d*. A cushion 10 that elastically supports a lower portion of the main body portion 4*a* from the rear is provided between the back side of the lower portion of the main body portion 4*a* and the under frame 2*d*.

The cover 4 has a side portion 4*b* that is sewn to a side portion of the main body portion 4*a*, as shown in FIGS. 3 and 4. The side portion 4*b* is made of net material or fabric material that has good stretch properties. The side portion 4*b* extends from the main body portion 4*a*, and covers the surface and sides of the pad 3 that is arranged on the front side of the main body portion 4*a*.

The pad 3 is made of resin foam, as shown in FIGS. 2 and 4, and has excellent cushioning characteristics. The pad 3 is arranged on the front side of the main body portion 4*a* of the cover 4. The pad 3 has a generally triangular cross section and extends in the vertical direction along the left and right edges of the seat frame 2.

The side frame 2*a* has a bracket 8 that is made of metal such as steel, as shown in FIGS. 2 and 3. The bracket 8 includes a mounting portion 8*a* that is mounted to the side frame 2*a*, and an extended piece 8*b* that is integrally provided with the mounting portion 8*a* and extends from the mounting portion 8*a*. The mounting portion 8*a* includes an attaching piece 8*a*1 that extends in the vertical direction and abuts against the outer surface of the side frame 2*a*, a front piece 8*a*2 that extends outward from the front edge of the attaching piece 8*a*1, and a rear piece 8*a*3 that extends outward from the rear end of the attaching piece 8*a*1. The extended piece 8*b* extends forward beyond a rear end edge of the pad 3 from a tip end edge of the front piece 8*a*2.

An air bag 9 and a cap 7 are attached to the bracket 8, as shown in FIGS. 2 and 4. The air bag 9 includes a case 9*a*, a bag 9*b*, and an inflator 9*c*. The case 9*a* is box-shaped, and is mounted to the outside surface of the side frame 2*a* by being attached to the attaching piece 8*a*1 of the bracket 8 by an attaching member 9*d*. The bag 9*b* is folded up and housed in the case 9*a*. The inflator 9*c* is attached to the attaching member 9*d* and positioned inside the case 9*a*. The inflator 9*c* produces gas by combusting chemicals, and this gas instantaneously inflates the bag 9*b*.

The cap 7 is made of resin and is attached to the bracket 8, as shown in FIGS. 2 and 4. The cap 7 includes a base portion 7*a*, a rising portion 7*b*, a side portion 7*c*, and a covering portion 7*d*, all of which are integrally provided. The base portion 7*a* is arranged on an outside surface of the extended piece 8*b* of the bracket 8, and has a pawl 7*g* that engages with the extended piece 8*b*. The base portion 7*a* overlaps with a tip end portion of the extended piece 8*b*, and is positioned between the extended piece 8*b* and a cover piece 6*b* of a board 6.

The rising portion 7*b* extends outward from a front end edge of the base portion 7*a*, as shown in FIG. 4. The side portion 7*c* extends forward from a tip end edge of the rising portion 7*b*. The covering portion 7*d* extends inward from a front end edge of the side portion 7*c*. A tip end edge of the covering portion 7*d* is inserted into a recessed portion 3*a* formed in the pad 3.

The cap 7 has a vertical portion 7*e* that extends in the vertical direction, and an upper portion 7*f* that extends rearward from an upper portion of the vertical portion 7*e*, as shown in FIGS. 2 and 3. The vertical portion 7*e* follows a front end edge of the cover piece 6*b* of the board 6. The upper portion 7*f* follows an upper end edge of the cover piece 6*b*.

The board (i.e., the back board) 6 is made of resin and includes a board main body 6*a*, the cover piece 6*b*, and a side piece 6*c*, all of which are integrally provided, as shown in FIGS. 2 and 3. The board main body 6*a* covers the seat frame 2 from the rear and forms a back surface of the seat back 1*a*. Hooks 6*d* that extend downward toward the front are formed on an upper portion of the front surface of the board main body 6*a*. The hooks 6*d* hook onto (i.e., catch on) the wire 2*e* from above. Protruding portions 6*e* that protrude forward are formed on a lower portion of the board main body 6*a*. The protruding portions 6*e* are attached to a lower side of the under frame 2*d* by screws 6*f*.

The side piece 6*c* extends forward from one side edge of the board main body 6*a* and covers the under frame 2*d*, as is shown in FIG. 2.

The cover piece 6*b* extends forward from the other side edge of the board main body 6*a*, as shown in FIGS. 2 and 4. The cover piece 6*b* covers the air bag 9 and extends forward beyond the air bag 9. A front portion of the cover piece 6*b* extends forward along the extended piece 8*b* of the bracket 8 and the base portion 7*a* of the cap 7. A tip end portion of the cover piece 6*b* extends beyond a rear end edge of the pad 3. A tip end portion of the extended piece 8*b* and the base portion 7*a* of the cap 7 are positioned between the cover piece 6*b* and the pad 3.

As shown in FIG. 4, a tip end edge 6*b*1 of the cover piece 6*b* is adjacent to the rising portion 7*b* of the cap 7. The rising portion 7*b* extends outward beyond the tip end edge 6*b*1 of the cover piece 6*b* from the base portion 7*a*. As a result, the rising portion 7*b* covers the tip end edge 6*b*1 of the cover piece 6*b* from the front. A connecting portion 7*b*1 of the rising portion 7*b* and the side portion 7*c* is positioned farther to the outside, e.g., 2 to 3 mm to the outside, than the tip end edge 6*b*1 of the cover piece 6*b*. The side portion 7*c* extends parallel to the cover piece 6*b*, and in a direction away from the cover piece 6*b*.

The cover piece 6*b* is retained in a cantilever shape with the respect to the board main body 6*a*, as shown in FIG. 4. A notch 6*b*3 is formed between the cover piece 6*b* and the board main body 6*a*. This notch 6*b*3 is formed on the inside surface of the cover piece 6*b*, and enables the tip end edge 6*b*1 of the cover piece 6*b* to easily move outward.

As shown by the virtual line in FIG. 4, when the air bag 9 deploys, the cover piece 6*b* is pushed outward by the bag 9*b* of the inflated air bag 9. The cover piece 6*b* deforms, and in particular, largely deforms at the base end portion where the notch 6*b*3 is formed. As a result, the tip end edge 6*b*1 of the cover piece 6*b* moves outward, such that the gap between the cover piece 6*b* and the cap 7 becomes larger. The bag 9*b* inflates forward of the seat back 1*a* from between the cover piece 6*b* and the cap 7.

As described above, the vehicle seat 1 includes the seat frame 2, the pad 3 that is attached to the seat frame 2, the air bag 9 that is attached to the seat frame 2, the board 6 that is attached to the seat frame 2 and covers the air bag 9, and the cap 7 that is made of material that is harder than the pad 3 and is attached to the seat frame 2, and extends forward of the tip end edge 6*b*1 of the board 6 from between the pad 3 and the board 6, as shown in FIG. 4.

The cap 7 is attached to the seat frame 2 so it will continue to be positioned forward of the tip end edge 6*b*1 of the board 6 even if the pad 3 deforms as a result of being pushed on. Therefore, the cap 7 is able to inhibit a finger or object from being inserted between the tip end edge 6*b*1 of the board 6 and the pad 3. Also, the cap 7 is harder than the pad 3 and thus will not deform as easily as the pad 3.

The cap 7 includes the base portion 7*a* that is positioned between the pad 3 and the board 6, the rising portion 7*b* that extends from the base portion 7*a* forward of the tip end edge 6*b*1, and the side portion 7*c* that extends in a direction away from the rising portion 7*b*, as shown in FIG. 4. Therefore, the cap 7 is able to inhibit an object from being inserted between the tip end edge 6*b*1 of the board 6 and the pad 3 by the base portion 7*a* and the rising portion 7*b*.

The side portion 7*c* of the cap 7 extends parallel to the cover piece 6*b* of the board 6 from the rising portion 7*b*, as shown in FIG. 4. Therefore, the side portion 7*c* and the board 6 aesthetically go together, and are thus able to enhance the aesthetics of the vehicle seat 1. The side portion 7*c* is positioned and shaped so that it is generally flush with the board 6. Therefore, the side portion 7*c* and the board 6 aesthetically go together, and are thus able to enhance the aesthetics of the vehicle seat 1.

The connecting portion of the rising portion 7*b* and the side portion 7*c* is positioned farther to the outside of the vehicle seat 1 than the tip end edge 6*b*1 of the board 6, as is shown in FIG. 4. Therefore, the rising portion 7*b* extends beyond the tip end edge 6*b*1 of the board 6 and is thus able to reliably cover the tip end edge 6*b*1 of the board 6 from the front. As a result, even if there is variation among the sizes of the board 6 and the cap 7 due to molding, the rising portion 7*b* is able to reliably cover the tip end edge 6*b*1 of the board 6 from the front.

The seat frame 2 includes the bracket 8, as shown in FIG. 4. The cap 7 is attached to the bracket 8, between the board 6 and the pad 3. Therefore, the cap 7 is able to be stably retained between the board 6 and the pad 3 by the bracket 8.

The bracket 8 is made of metal and extends beyond the tip end edge 6*b*1 of the board 6, between the board 6 and the pad 3, as shown in FIG. 4. The cap 7 is attached to the bracket 8. Therefore, the bracket 8 is able to stably retain the cap 7, because the bracket 8 is made of metal. Also, the bracket 8 is positioned near the tip end edge 6*b*1 of the board 6, and is thus able to stably retain the cap 7 near the tip end edge 6*b*1 of the board 6. Accordingly, the cap 7 is stably retained in a position near the tip end edge 6*b*1 of the board 6. Thus, the cap 7 is able to reliably inhibit an object from being inserted between the tip end edge 6*b*1 of the board 6 and the pad 3.

Figure 5:
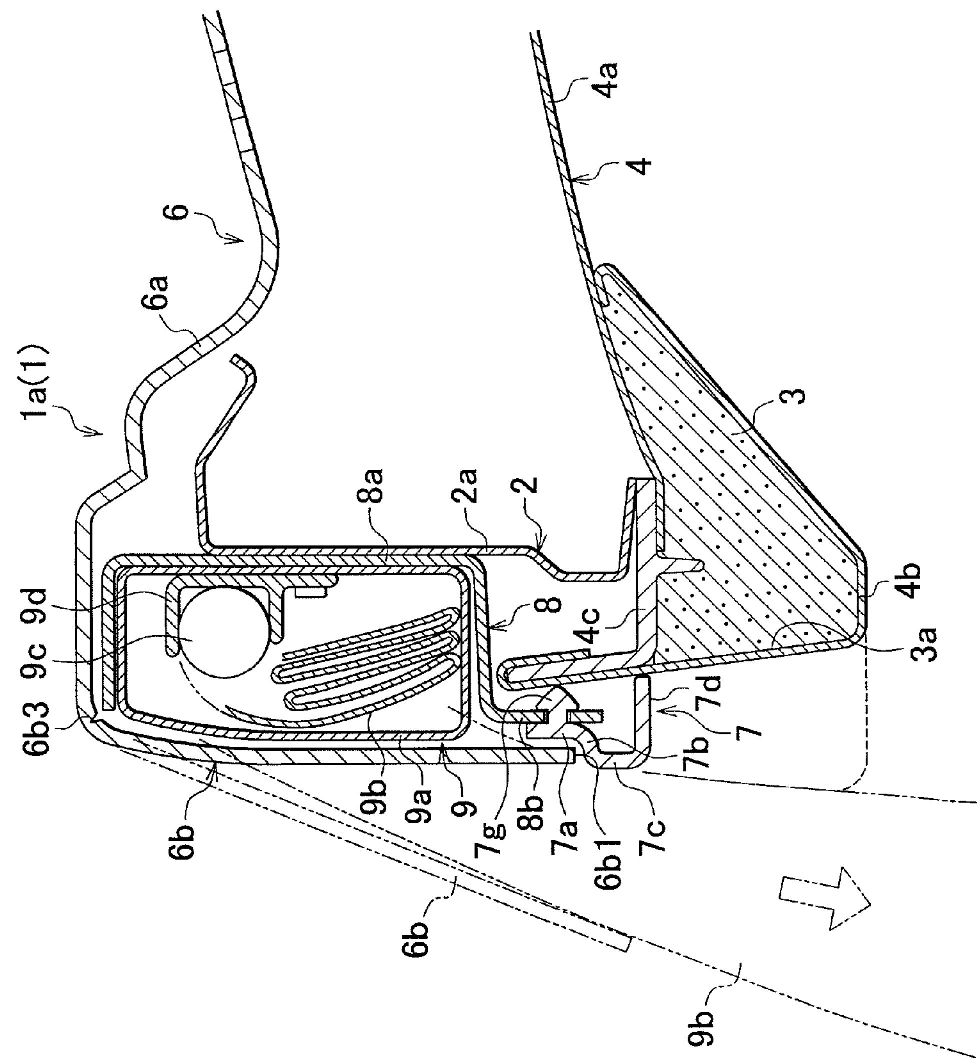
FIG. 5 is a modified example of a seat back.

The invention is not limited to the example embodiment described above. That is, other modes such as those described below are also possible. For example, the board 6 may cover the air bag 9, and the tip end edge 6*b*1 may extend beyond the pad 3, or the tip end edge 6*b*1 may not extend beyond the pad 3. When the tip end edge 6*b*1 does not beyond the pad 3, the covering portion 7*d* may extend toward the covering frame 4*c* to contact with the covering frame 4*c* (see FIG. 5). The covering portion 7*d* may be adjacent to the covering frame 4*c* without contacting the covering frame 4*c*. The pad 3 may be expanded so that it is generally flush with the side portion 7*c* of the cap 7 (see a dashed line of FIG. 5).

The air bag 9 and the board 6 may be provided on the seat back 1*a*, or may be provided on the seat cushion 1*b* or a headrest.

The board 6 may cover the back side of the seat frame 2 and form the entire back surface of the seat back 1*a*, form part of the back surface of the seat back 1*a*, or form only a side surface of the seat back 1*a*.

The pad 3 may be the size of only the side region of the seat back 1*a*, or may be approximately the same size as the surface region of the seat back 1*a*.

Figure 6:
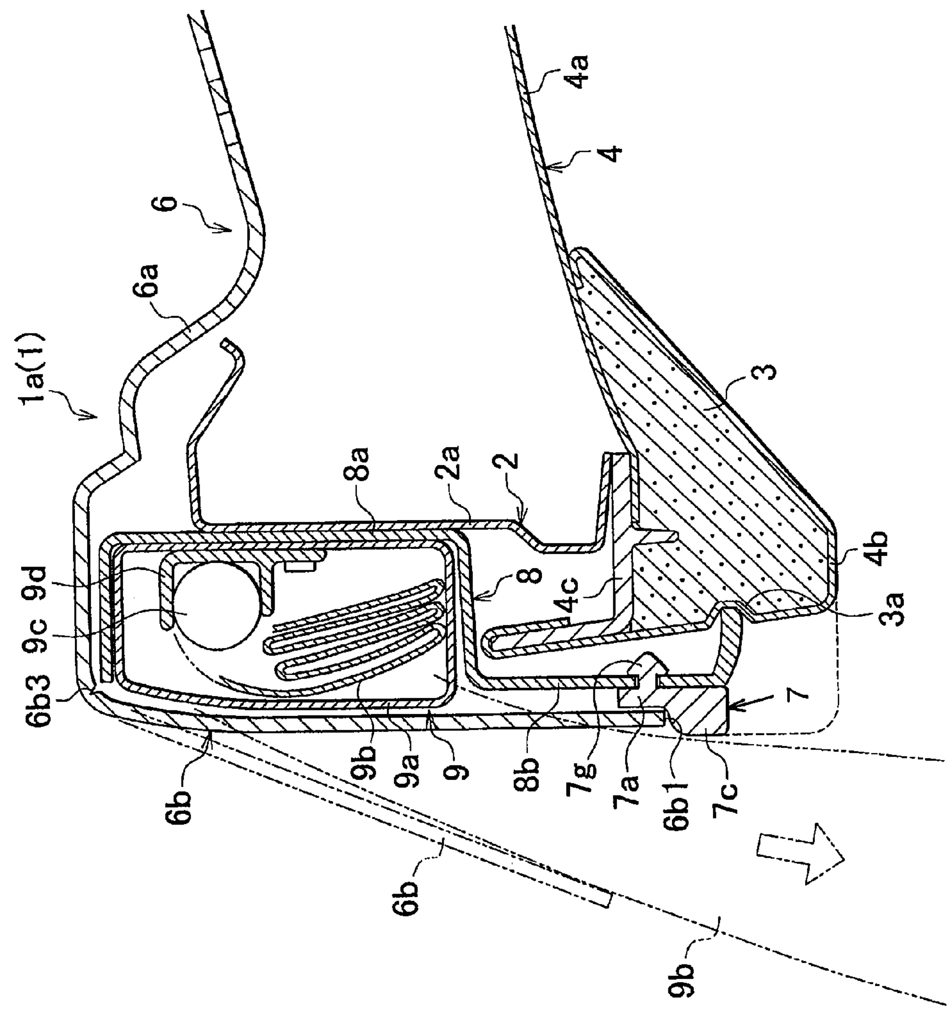
FIG. 6 is another modified example of a seat back.

The cap 7 may be made of resin or may be made of other material that is harder than the pad 3. For example, the cap 7 may be made of a metal such as steel. The cap 7 may have the side portion 7*c* and the covering portion 7*d*, may have no the covering portion 7*d*, or may have neither the side portion 7*c* nor the covering portion 7*d*. When the cap 7 may have no covering portion 7*d*, a tip end edge of the bracket 8 may extend toward the pad 3 (see FIG. 6). When the cap 7 may have the covering portion 7*d*, the covering portion may be adjacent to the pad 3 without contacting the pad 3. The pad 3 may be expanded so that it is generally flush with the side portion 7*c* of the cap 7 (see a dashed line of FIG. 6).

The bracket 8 may be a member that is separate from the side frame 2*a*, or the bracket 8 and the side frame 2*a* may be formed by a single member. The cap 7 may be a member that is separate from the bracket 8, or the cap 7 and the bracket 8 may be formed by a single member.

The bracket 8 may be made of metal or may be made of resin or the like that is harder than the pad 3.

The vehicle seat 1 may be mounted in a vehicle, a marine vessel, or an aircraft or the like.

What is claimed is:

1. A vehicle seat with an air bag, comprising:

a seat frame, wherein the air bag is attached to the seat frame;

a pad that is attached to the seat frame;

a board that is attached to the seat frame and covers the air bag; and a cap that is made of material harder than the pad and is attached to the seat frame, and extends forward of a tip end edge of the board through a gap between the pad and the board, wherein the board overlaps a portion of the cap at an outside of the vehicle seat.

2. The vehicle seat with an air bag according to claim 1, wherein the cap includes a base portion that is positioned between the pad and the board, a rising portion that extends from the base portion so as to cover the tip end edge of the board, and a side portion that extends from the rising portion in a direction away from the board.

3. The vehicle seat with an air bag according to claim 2, wherein the cap includes a covering portion that extends from a tip end of the side portion toward the pad and covers a gap between the pad and the board.

4. The vehicle seat with an air bag according to claim 2, wherein a tip end edge of the covering portion is inserted into a recessed portion formed in the pad.

5. The vehicle seat with an air bag according to claim 2, wherein a connecting portion of the rising portion and the side portion is positioned farther toward the outside of the vehicle seat than the tip end edge of the board.

6. The vehicle seat with an air bag according to claim 1, wherein the seat frame includes a bracket, and the cap is attached to the bracket between the board and the pad.

7. The vehicle seat with an air bag according to claim 1, wherein the board includes a cover piece that covers the air bag and extends forward, and the side portion of the cap extends substantially parallel to the cover piece.

* * * * *